Oct. 30, 1934.   F. W. COTTERMAN   1,978,835
LUBRICATING MECHANISM
Filed June 10, 1933
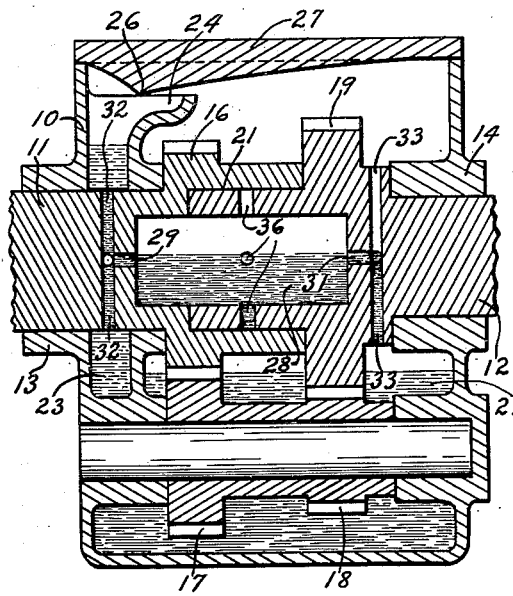
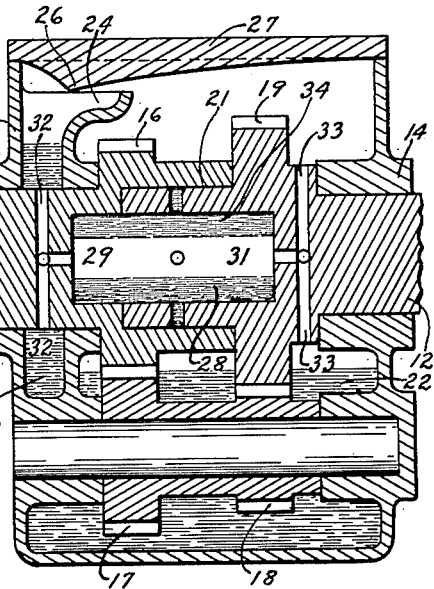
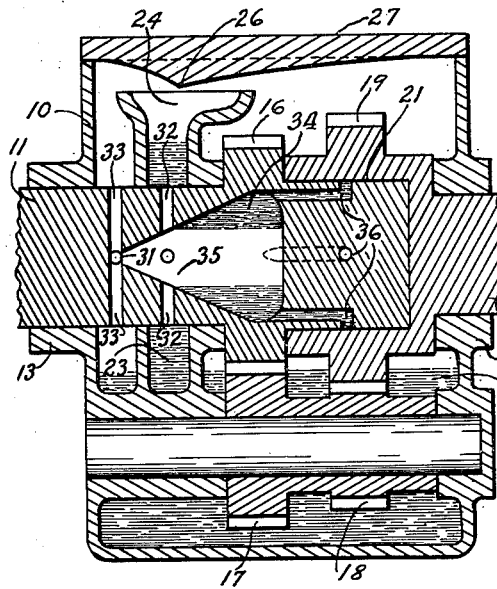
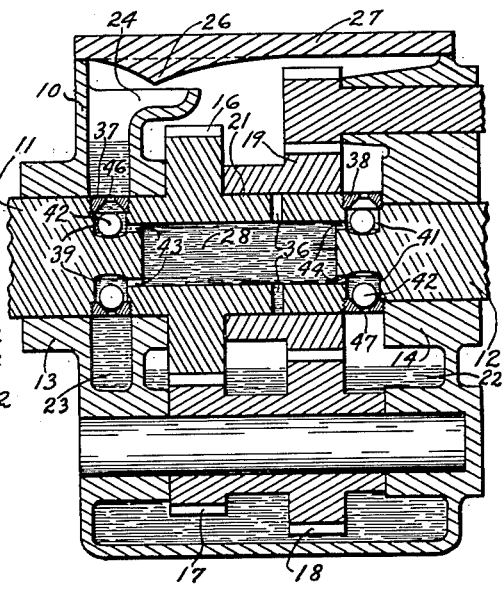
INVENTOR.
Frederick W. Cotterman Patented Oct. 30, 1934

1,978,835

UNITED STATES PATENT OFFICE 1,978,835

LUBRICATING MECHANISM

Frederick W. Cotterman, Dayton, Ohio, assignor of one-half to Bessie D. Apple, Dayton, Ohio Application June 10, 1933, Serial No. 675,238

8 Claims. (Cl. 308—107)

This invention relates to lubricating mechanism and particularly to mechanism for lubricating a member which rotates about a second member which also rotates, but at a different speed, or, in a different direction. Certain parts of the subject matter of this invention were disclosed in and divided from my copending application Serial Number 555,186 (Patent No. 1,917,501). These parts comprise the central reservoir in the shafts shown in Figs. 1 and 2, the oil openings 36 and vent openings 31 and 33, oil-feeding passages 32 and 29 and an oil reservoir over the oil-feeding passages of a different design from that shown in this application.

Conditions are encountered in the lubrication of machinery where a shaft which alternately rotates and stops has rotatable members which have their rotative bearing on the shaft.

Under such conditions it is desirable that the lubrication of the rotatable members be accomplished by providing a chamber in the center of the shaft from which lubricant may be directed radially outward through holes in the shaft to the inside of the bearing surfaces of the rotatable members.

Where the ends of such a shaft are accessible such a problem presents no difficulty for then it is only necessary to allow lubricant to flow into a central hole in the end of the shaft.

Also when it is not objectionable to employ a pump, the problem is relatively simple, for then sufficient pressure may be applied to force the lubricant radially inward, through holes in the side of the shaft, into the chamber in the center of the shaft, and the same pressure will prevent centrifugal force from throwing the lubricant back and out of the holes through which it entered.

But where the ends of the shaft are not accessible, and where a pump is objectionable, the problem resolves itself into one of causing lubricant to flow radially inward through holes in the side of the shaft to a chamber in the center of the shaft when the shaft is not rotating, and then, when the shaft rotates, preventing centrifugal force from throwing the oil back out of the same holes through which it entered, and providing other radial holes from the chamber through the sides of the shaft to the bearing surfaces of the members which rotate upon it.

The object of this invention is to provide mechanism which will solve the foregoing problem.

This object is attained by the mechanism hereinafter described, reference being had to the drawing, wherein, Fig. 1 is a vertical axial section through a preferred embodiment of the invention when the mechanism is at rest and Fig. 2 shows the same section when the mechanism is rotating.

Figs. 3 and 4 show modifications of the invention.

Similar numerals refer to similar parts throughout the several views.

The housing 10 contains the high speed shaft 11 and the low speed shaft 12, rotatable in bearing hubs 13 and 14 respectively. The high speed shaft 11 is connected to the low speed shaft 12 through reduction gearing 16, 17, 18 and 19. Shaft 12 has rotative bearing within shaft 11 at 21. It is this bearing which is difficult to lubricate unless the lubricant is applied from within the shaft and directed radially outward. The mechanism is such that the shafts 11 and 12 rotate part of the time and are at rest part of the time.

The lower part of the housing 10 is kept filled with lubricant as at 22, the upper level of the lubricant being somewhat below the shafts 11 and 12. Within the bearing hub 13 a reservoir 23 is formed for lubricant. This reservoir is open at the top and flared as at 24. A fin 26 is cast on the housing cover 27. This fin directs the lubricant which is splashed from the main supply 22, by the gears 17 and 18 against the cover 27, into the top 24 of the reservoir 23. When the mechanism has been rotating for sometime the reservoir 23 becomes full of lubricant to the top 24.

Within the shafts 11 and 12 the chamber 28 is formed. A part of this chamber may be contained in each shaft, or all of it may be contained in one of the shafts. Small openings 29 and 31 extend axially from the chamber 28. Small filler openings 32 extend radially inward connecting the chamber 23 to the small opening 29 whereby lubricant may be conveyed from the reservoir 23 to the chamber 28. Other small air vent openings 33 extend radially outward from the small opening 31 through the side of the shaft 12.

The operation of the mechanism is as follows:

When the gears 17 and 18 revolve, they splash lubricant from the lower level 22 against the housing cover 27, and the fin 26 directs it into the flared top 24 of the reservoir 23. As long as the shaft 11 rotates, no lubricant enters the filler holes 32 because it cannot flow radially inward against centrifugal force. When, however, the shaft 11 comes to rest, the lubricant flows in at the holes 32, axially through the hole 29 and into the chamber 28. The air which the lubricant displaces escapes from the vent holes 31 and 33. When the chamber is slightly more than half filled, no more lubricant will enter because the air which is trapped in the upper half of the chamber 28 has no means of escape.

Now when the shafts 11 and 12 again rotate the lubricant in the holes 29 and 32 is thrown by centrifugal force back into the reservoir 23, and such lubricant as may then be in holes 31 or 33 is thrown back into the main supply 22, but that part of the lubricant which is in the chamber 28 when the shafts start to rotate instantly is formed by centrifugal force into a layer as at 34 Fig. 2, around the circumference of the chamber 28. From the layer 34 it is fed outwardly as needed through the feeder holes 36 to the bearing 21.

It will be seen that, as long as the parts containing the chamber 28 rotate, no part of the layer 34 of lubricant may escape through the holes 29 or 31, for, to do so, the lubricant must move toward the axis of rotation against centrifugal force. It will also be readily seen that a considerable supply is trapped in the chamber 28 each time the rotatable elements start and stop. All this is had by mere proportioning and arrangement of the series of openings 29, 31, 32 and 33 in conjunction with the reservoirs 22, 23 and the chamber 28, no pump nor valves being required.

In the modification shown in Fig. 3 the filler holes 32 and the vent holes 33 are both at the same end of the chamber 28. Here the chamber 28 is of very small diameter at 31 where it connects with the vent holes 33 but somewhat larger at 35 where the filler holes enter. The capacity of the chamber at 35 is greater than that of the filler holes 32, therefore the air which must be forced from the chamber may get to the end 31 to pass out of the vents 33. The layer 34 of lubricant is retained after the members rotate just as it is in Fig. 2.

In the modification shown in Fig. 4 a series of valve seats 37 and 38 having holes 46 and 47 are threaded into the side of the shaft at spaced apart intervals around its circumference. The pockets 39 under each seat 37 and the pockets 41 under each seat 38 hold the balls 42 loosely. Small holes 43 and 44 connect the pockets 39 and 41 respectively with the chamber 28.

The modification shown has the advantage over the preferred embodiment in that the chamber 28 may become completely filled with lubricant when the several rotatable parts come to rest and remain at rest for a sufficient length of time. It will be apparent that when the mechanism is at rest the balls 42 in the upper half of the shafts 11 and 12 are always off the seats 37 and 38 while the balls 42 in the lower half of the shafts are always on the seats 37 and 38. The lubricant then flows from the reservoir 23 through the holes 46, the pocket 39, hole 43 into the chamber 28, any surplus flowing out through the hole 44, pocket 41 and hole 47.

When the modified mechanism Fig. 4 rotates, all the balls 39 are kept on the seats 37 by centrifugal force, and in such case there is no outlet from chamber 28 for the lubricant therein except through the feeder holes 36.

Having described my invention, I claim,

1. Lubricating mechanism comprising a housing, two members rotatable within said housing, the one member having a bearing surface on its outside for the other said member and a hollow chamber on its inside for lubricant for the bearing surface, with feeder openings connecting said chamber to the bearing surface, and with filler and vent openings both smaller than said chamber extending axially from the ends of said chamber nearer the axis of rotation than said feeder opening, and with small openings extending radially from the filler and vent openings through to the outside of the rotatable members, and means containing a reservoir for holding a supply of lubricant around the outside of a rotatable member over the radial openings which connect to the filler openings.

2. Power transmission mechanism comprising a housing, members rotatable within said housing, one rotatable member having a bearing surface on its outside for another of said rotatable members and a hollow chamber on its inside for lubricant for said bearing surface, with feeder openings connecting said chamber and said bearing surfaces, with vent openings connecting said chamber to the outside of said one rotatable member, and with filler openings extending from said chamber to the periphery of said one rotatable member, and means containing a reservoir for holding a supply of lubricant around the outside of said one rotatable member over the outer ends of said filler openings, said vent and filler openings entering said chamber nearer the axis of rotation than said feeder openings.

3. Power transmission mechanism comprising, a housing, members rotatable within said housing, one rotatable member having a bearing surface on its outside for another of said rotatable members, means containing a hollow chamber, the periphery of said chamber being nearer the axis of rotation than the said bearing surface, and having a feeder opening connecting said periphery to said bearing surface, with a vent opening connecting said chamber to the periphery of said one rotatable member, and a filler opening connecting said chamber to the periphery of said one rotatable member, and means containing a reservoir for holding a supply of lubricant around the periphery of said one rotatable member over the outer end of said filler opening, said vent and filler opening entering said chamber nearer the axis of rotation than said feeder openings.

4. Power transmission mechanism comprising, a housing, members rotatable within said housing, one rotatable member having a bearing surface on its outside for another of said rotatable members, means containing a hollow chamber, the periphery of said chamber being nearer the axis of rotation than the said bearing surface, and having a feeder opening connecting said periphery to said bearing surface, and having a vent opening connecting said chamber to the periphery of said one rotatable member, and having a filler opening connecting said chamber to the periphery of said one rotatable member, and means containing a reservoir for holding a supply of lubricant around the periphery of said one rotatable member over the outer end of said filler opening, said filler opening entering the said chamber closer to the axis of rotation than said feeder opening, and said vent opening entering the said chamber still closer to the axis of rotation than said filler opening.

5. Power transmission mechanism comprising a housing, members rotatable within said housing, one rotatable member having a rotative bearing surface on its outside for another rotatable member, means containing a hollow chamber the periphery of which is nearer the axis of rotation than the bearing surface and having a feeder opening connecting said periphery to said bearing surface, and having a vent opening connecting said chamber to the interior of said housing, and having a filler opening connecting said chamber to the periphery of the said one rotatable member, means containing a reservoir for holding a supply of lubricant around the periphery of said one rotatable member over the outer end of said filler opening, said filler and said vent opening entering said chamber closer to the axis of rotation than said feeder opening, said reservoir being open at the top, and means to splash lubricant from a main supply in the bottom of said housing to the top of said housing and into the open end of said reservoir.

6. The structure defined in claim 5 in which the top of the reservoir is flared and there is a fin on the inside of the top of the housing adapted to direct the splashed lubricant into the open top of said reservoir.

7. Lubricating mechanism comprising a housing having space within it, two members rotatable within said space, one of said members having rotative bearing on the outside of the other, there being a hollow chamber within said rotatable members for lubricant for said rotative bearing with a feeder opening connecting said chamber to the said bearing, means containing a reservoir for holding a supply of lubricant around the outside of one of the rotatable members, there being a small filler opening extending from said reservoir into said chamber and a small vent opening extending from said space into said chamber, both filler and vent openings entering said chamber nearer the axis of rotation than the outside of said chamber.

8. Lubricating mechanism comprising a hollow housing partly filled with lubricant and partly filled with air, two members rotatable within said hollow housing, one of said members having rotative bearing on the outside of the other, there being a hollow chamber within said rotatable members for lubricant for said rotative bearing with a feeder opening connecting the said chamber to the said bearing, means containing a reservoir for holding a supply of lubricant around the outside of one of the rotatable members, there being a small filler opening extending from said reservoir to a point nearer to the axis of rotation than said feeder opening, thence into said chamber, and a small vent opening extending from the air space within the housing to a point nearer the axis of rotation than said feeder opening, thence into said chamber.

FREDERICK W. COTTERMAN.